(12) United States Patent
Poe

(10) Patent No.: US 6,322,094 B1
(45) Date of Patent: Nov. 27, 2001

(54) TRAILER HITCH SAFETY COVER

(76) Inventor: Edgar A. Poe, 8216 Burnell La., Knoxville, TN (US) 37920

(*) Notice: Subject to any disclaimer, the term of this patent is extended or adjusted under 35 U.S.C. 154(b) by 0 days.

(21) Appl. No.: 09/634,452

(22) Filed: Aug. 8, 2000

(51) Int. Cl.⁷ .................................................. B60D 1/173
(52) U.S. Cl. ........................................... 280/507; D12/162
(58) Field of Search ..................... 280/507, 504, 280/506, 511; D12/162; 293/117; 150/166

(56) References Cited

U.S. PATENT DOCUMENTS

| | | |
|---|---|---|
| D. 415,080 | 10/1999 | Schultz . |
| D. 422,951 * | 4/2000 | Everett ................. D12/162 |
| 3,228,445 * | 1/1966 | Matotte ................. 280/507 |
| 3,596,926 * | 8/1971 | Randall ................. 280/507 |
| 4,955,968 | 9/1990 | Beckerer, Jr. . |
| 5,037,122 | 8/1991 | Beckerer, Jr. . |
| 5,533,743 | 7/1996 | Bello . |
| 5,560,631 * | 10/1996 | Salvo ................... 280/507 |
| 5,791,677 | 8/1998 | Froehlich . |
| 5,829,774 * | 11/1998 | Klemp .................. 280/507 |
| 5,934,699 | 8/1999 | Blake . |
| 6,039,339 | 3/2000 | Bello . |

FOREIGN PATENT DOCUMENTS

| | | | |
|---|---|---|---|
| 3233813 * | 11/1983 | (DE) ..................... 280/507 |
| 2097306 * | 3/1972 | (FR) ..................... 280/507 |
| 2176759 * | 1/1987 | (GB) ..................... 280/507 |

OTHER PUBLICATIONS

BAGE Co. Hitch Accessories http:bagecompany.hypermart-.net/hitchaccess.htm. Undated.
Hitch Cover Concepts, LLC http://www.hitchcoverconcepts.com/playtag.html. Undated.
Hitch http://www.hitch-it.com/products.htm. Undated.

* cited by examiner

Primary Examiner—Daniel G. DePumpo
(74) Attorney, Agent, or Firm—Pitts & Brittian, P.C.

(57) ABSTRACT

A safety cover for a trailer hitch which has a tow ball and a draw bar. The cover serves to protect and to cover the trailer hitch and to prevent injury to those working in the vicinity of the trailer hitch. The cover is first comprised of a shell which is dimensioned to be large enough and deep enough to cover both the tow ball and at least a portion of the drawbar. The shell is fabricated from durable material and is configured to have no exposed sharp edges. Inside of the shell is a filler material. The filler material is a malleable substance such as rubber or plastic. The filler material fills the shell and forms a base. The filler material includes a cavity which is shaped to closely receive the tow ball and draw bar of the trailer hitch. This allows the cover to fit over the trailer hitch with minimal play. Finally, a fastener is placed at the base of the filler material proximal to the back side of the of the cover. The fastener further secures the cover onto the trailer hitch by wrapping under the drawbar.

7 Claims, 3 Drawing Sheets

TRAILER HITCH SAFETY COVER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates generally to covers for trailer hitches. More specifically, the present invention relates to a cover for a trailer hitch which provides an attractive yet utilitarian shell in order to protect and to cover a trailer hitch, and to prevent injury to those working in the vicinity of a trailer hitch.

2. Description of the Related Art

Hitches are commonly attached to the rear bumper of a vehicle for the purpose of pulling a trailer. These hitches typically employ a tow ball at the distal end for receiving a trailer. At the proximal end, the hitch defines a draw bar which attaches to the rear bumper of a vehicle. Such trailer hitches are frequently used by truck owners to pull a trailer having a boat or perhaps lawn maintenance materials.

A hazard inherent with the use of trailer hitches is the potential for those working in proximity to the trailer hitch to inadvertently bump their leg against the hitch. In this regard, a trailer hitch which is attached to a vehicle but is not hitched to a trailer creates a risk to those walking around the rear of the vehicle of coming into contact with the trailer hitch. This, in turn, can cause injury to the kneecap, shin, or other part of the lower extremities. In the case of smaller children, an even greater risk of injury exists inasmuch as trailer hitches are at face or even eye level.

In an effort to avoid injury, covers have been constructed which cover an extended portion of a trailer hitch. For example, U.S. Pat. Nos. 4,955,968 and 5,037,122 issued to Beckerer, Jr., in 1990 and 1991, respectively, provide a protective cover for a trailer hitch which runs the length of the hitch. These covers included a dome extending upwards in order to cover the tow ball. However, these covers do not minimize the risk of injury to one who is walking around the rear of a vehicle and who bumps a lower extremity against the side or a front edge of the cover. These devices essentially substitute one hard object having sharp edges for another of similar shape.

In U.S. Pat. Nos. 5,533,743 and 6,039,339, issued in 1996 and in 2000, respectively, to Bello, a cover for a trailer hitch is offered which is of softer material. In the '743 patent, the device is described as being a shock absorbing material. In the '339 patent, the material is an inflatable and deflatable rubber or plastic. In each case, the cover comprises portions which extend away from the tow ball and towards the rear bumper at an angle. While these covers assist in minimizing the risk of injury to one who is walking around the rear of a vehicle, it is evident that a deformable substance may deform too much, with the lower extremity still being capable of hitting the side of the trailer hitch. Moreover, the deformable or inflatable substance suffers from having a shorter life than a more rigid material inasmuch as such can be torn or punctured.

It is clear that a need remains for a trailer hitch cover which is durable, yet which protects those walking towards the trailer hitch from receiving a direct blow to the lower extremities.

Therefore, it is an object of the present invention to provide a trailer hitch cover which is externally constructed of a durable material.

It is another object of the present invention to provide a trailer hitch cover which does not conform to the shape of the trailer hitch, but which has durable members which extend away from the trailer hitch at an angle, thereby protecting those walking towards the trailer hitch from receiving a direct blow to the lower extremities.

Still further, it is an object of the present invention to provide a trailer hitch cover which has no sharp edges.

It is yet another object of the present invention to provide a trailer hitch cover which is attractive, and which allows for the easy mounting of a trademark or decoration for display.

And yet a further object of the present invention is to provide a trailer hitch cover which is easily mounted when the trailer hitch is not in use, and then removed when the trailer hitch is to be employed.

BRIEF SUMMARY OF THE INVENTION

Other objects and advantages of the present invention will become more apparent upon reviewing the detailed description and associated figures of the trailer hitch safety cover. In the apparatus of the present invention, a cover is provided which fits onto a trailer hitch.

The cover serves to cover both the tow ball portion of the trailer hitch, and the drawbar portion.

The cover is first comprised of a shell fabricated from durable material. An example of such a durable material is fiberglass. The shell is dimensioned to be large enough and deep enough to cover both the tow ball and the distal end of the drawbar. The shell defines the top and side walls of the cover.

The shell is configured to have no sharp edges. In addition, it is configured to have side walls which extend away from the end of the trailer hitch and towards the rear bumper of the vehicle at an angle. The angle should be of sufficient magnitude away from the trailer hitch such that a person who inadvertently contacts the cover while working at the rear of the vehicle would sustain only a glancing or indirect blow to the lower extremities. In this way, the risk of a more serious injury as would be caused by a direct blow is minimized.

Inside of the shell is a filler material. In the preferred embodiment, the filler material is a malleable substance such as rubber or plastic. A more specific example would be expandable polyurethane foam. The filler material fills the shell and forms a base. The filler material includes a cavity which is shaped to closely receive the tow ball and draw bar of the trailer hitch. This allows the cover to fit over the trailer hitch with minimal play.

Finally, a fastener is placed at the base of the filler material proximal to the back side of the of the cover. The fastener further secures the cover onto the trailer hitch by wrapping under the drawbar. In the preferred embodiment, the fastener is a strip of fabric connected to the filler material by hook and loop.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
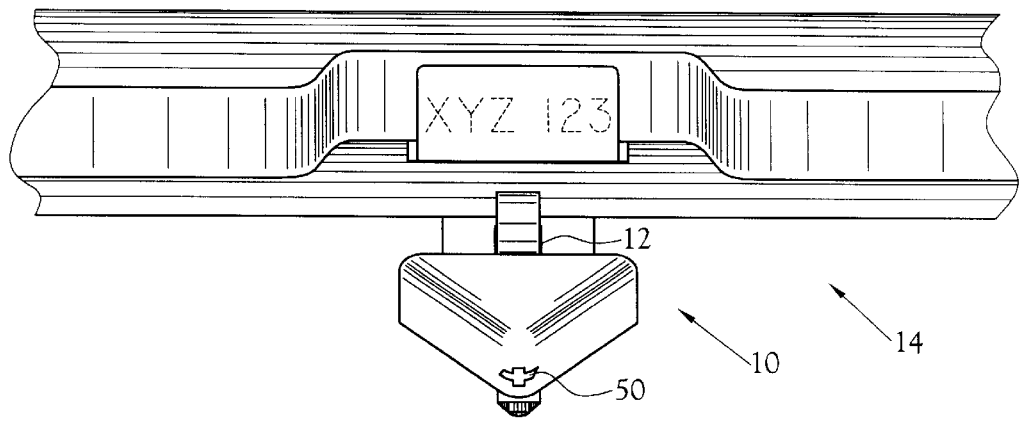
FIG. 1 is a perspective view of the trailer hitch safety cover of the present invention, as attached to a trailer hitch at the rear of a pick-up truck.

A trailer hitch cover of the present invention is illustrated generally at 10 in FIG. 1. The cover 10 is designed to provide a housing for a trailer hitch 40 in order to protect it from the elements during times of non-use. Moreover, the cover 10 provides a means of reducing the likelihood and severity of injury to the lower extremities of those walking near a trailer hitch 40 connected to the back of a vehicle 14.

The trailer hitch safety cover 10 of the present invention first provides a shell 20. The shell 20 is fabricated from a durable material which does not readily deform upon contact. In the preferred embodiment, the shell 20 is comprised of fiberglass.

Figure 2:
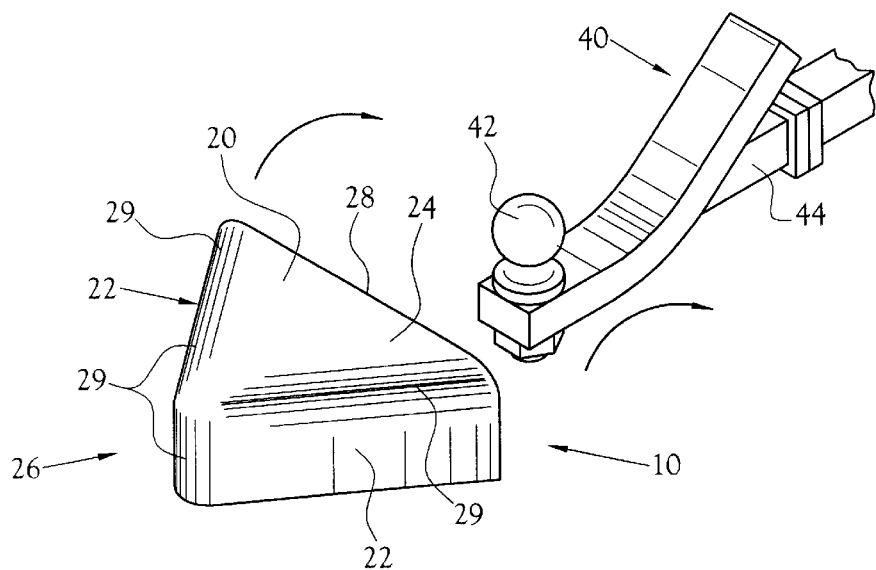
FIG. 2 is a perspective view of the safety cover of the present invention, to be positioned over a trailer hitch.
Figure 5:
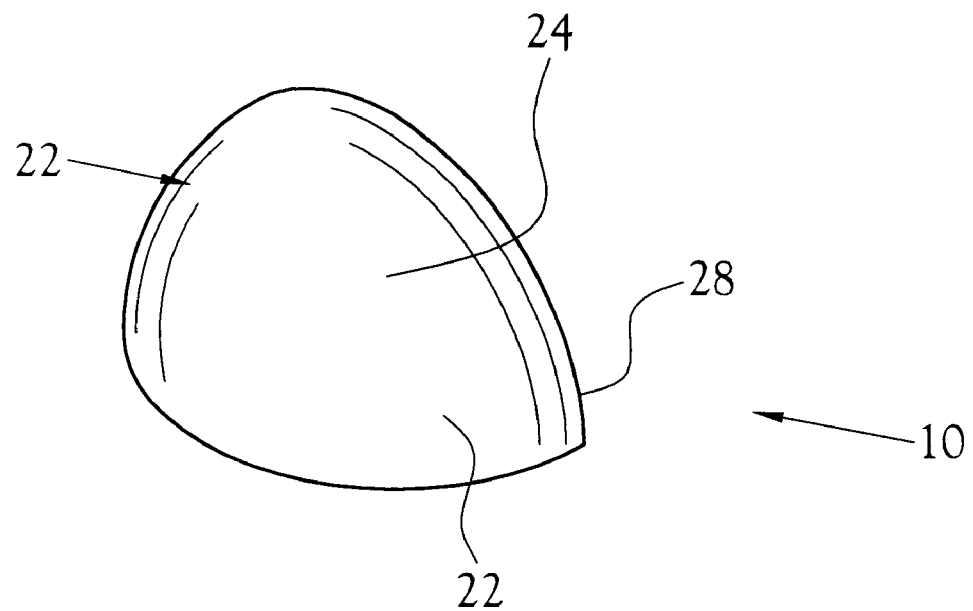
FIG. 5 is a perspective view of an alternate embodiment of the trailer hitch safety cover of the present invention.

The shell 20 may be of any shape so long as there are no exposed sharp edges which might come into contact with the lower extremity of a person who is walking or working in the vicinity of the cover 10. To effectuate this requirement, it is necessary that the shell 20 have an upper surface 24 over the trailer hitch 40, and then side surfaces 22 which extend away from the trailer hitch 40. FIG. 2 presents a preferred configuration showing the upper surface 24 to be essentially horizontal to the ground, and the side surfaces 22 being essentially perpendicular to the ground when the cover 10 is mounted. In this embodiment, the shell has a more distinguishable top surface 24 and two side surfaces 22. However, those of ordinary skill in the art will understand that other configurations are possible. For example, the shell 20 could be in the shape of a half-dome, as shown in FIG. 5.

To avoid the presence of edges which could be struck by an individual's legs, the two side surfaces 22 on the cover 10 of the preferred embodiment are offset at an angle, with the two side surfaces 22 coming together at an end to form a rounded vertex 26. The angle formed by the two side surfaces 22 should be large enough such that a person who inadvertently strikes a side surface 22 with a lower extremity while walking near the trailer hitch 40 would receive only a glancing blow, and not a direct blow. In the preferred embodiment, this angle is at least 45 degrees. Moreover, the exposed edges 29 formed between the side surfaces 22, the top surface 24 and the vertex 26 should be rounded to again minimize injury to the lower extremities of persons who might inadvertently contact the cover 10. In this regard, the presence of a sharp edge between either a side surface 22 and the top surface 10, or between the two side surfaces 22 at vertex 26, would increase the risk of injury to one who accidentally bumps the cover 10.

An additional advantage of having a smooth edge 29 at vertex 26 is the opportunity to place a decorative design or trademark at the vertex 26. Such features are valued by those who sell conversion kits for automobiles, and are attractive to purchasers of the cover 10. The cover 10 depicted in FIG. 1 presents a decal 50 having the well-known Chevrolet™ mark as an example.

The dimensions of the cover 20 may vary in accordance with the size of the trailer hitch 40 sought to be covered. Those skilled in the art will understand that trailer hitches come in numerous sizes and shapes. In the embodiment depicted in FIG. 2, the two side surfaces 22 of the shell 20 are approximately 4 inches (10.16 cm.) in depth, and 9 and ½ inches (24.13 cm.) in length. The top surface 24 is approximately 12 inches (30.48 cm.) in width as measured at its back side 28. However, these dimensions may vary depending upon the angle formed at the vertex 26 by the two side surfaces 22.

Figure 3:
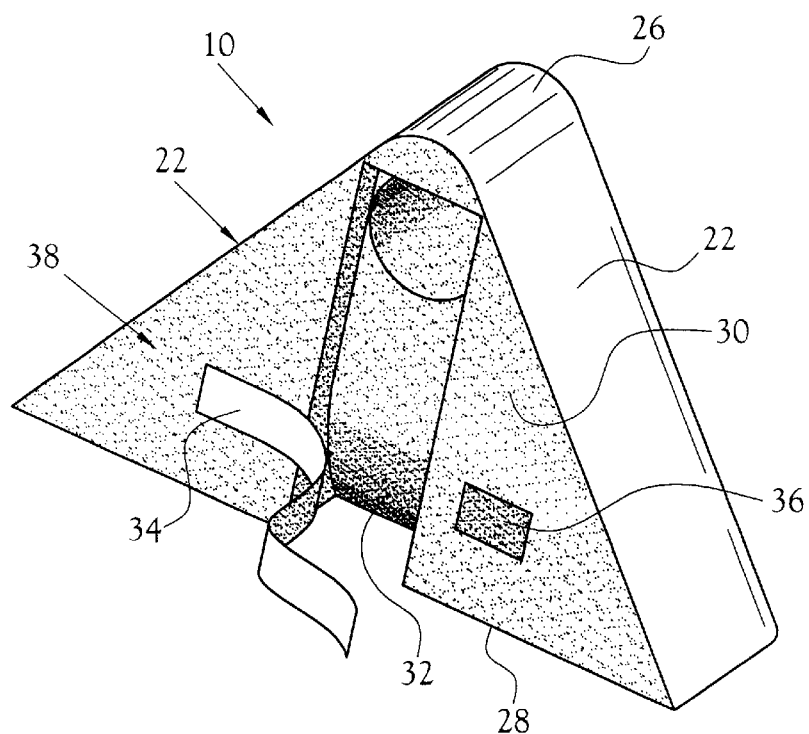
FIG. 3 is a bottom view of the trailer hitch safety cover of the present invention, in perspective.
Figure 4:
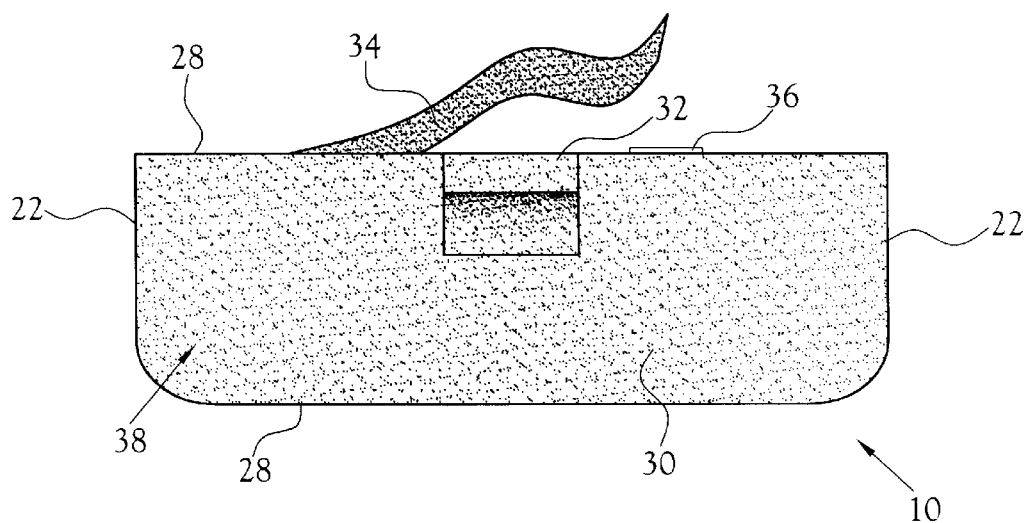
FIG. 4 is an elevation view of the back side of the trailer hitch safety cover of the present invention, with the cover upside down.

As shown in FIG. 1 and FIG. 2, the trailer hitch cover 10 of the present invention is designed to cover a trailer hitch 40. It is evident, however, that merely resting the cover 10 over the trailer hitch 40 does not provide the most secure attachment. To effectuate a more secure attachment of the cover 10 onto the trailer hitch 40, the inside of the shell 20 is filled with a filler material 30. The filler material fills the shell and forms a base 38. At the same time, a cavity 32 is fabricated into the filler material 30 which is dimensioned to closely fit the tow ball 42 and drawbar 44 of the trailer hitch 40. These features, demonstrated in FIG. 3 and FIG. 4, allow the cover 10 to fit over the trailer hitch 12 with minimal play.

In order to allow the filler material 30 to receive the tow ball 42 and a portion of the drawbar 44 of the trailer hitch 40 securely, the filler material 30 should define a pliable substance. Such substances include rubbers and plastics. In the preferred embodiment, the filler material 30 is a plastic comprising an expandable polyurethane foam. The pliable nature of the filler material 30 further allows a modest amount of yield when a lower extremity comes into contact with the cover 10.

Finally, a fastener 34 is placed within the filler material 30 at its base 38. The fastener 34 is used to further secure the cover 10 onto the trailer hitch 40. In the preferred embodiment, the fastener 34 is positioned proximal to the back side 28 of the cover 10. The fastener 34 first comprises a strip of fabric. One end of the fastener 34 is attached to the filler material 30 proximal to one side surface 22. The fastener 34 is then wrapped under the drawbar 44 when the cover 10 is positioned onto the trailer hitch 40. The other end of fastener 34 is attached to the filler material 30 by a hook-and-loop connector 36 proximal to the opposite side surface 22.

Those skilled in the art will understand that other methods of securing the cover 10 to the trailer hitch 40 exist. For example, snaps (not shown) could be used to secure a strip of fabric around the drawbar and to the cover 10. Such methods allow the cover 10 to be quickly secured to the trailer hitch 40 upon engagement therewith.

From the foregoing description, it will be recognized by those skilled in the art that a trailer hitch cover offering advantages over the prior art has been provided. While a preferred embodiment for the foregoing has been shown and described, it will be understood that the description is not intended to limit the disclosures, but rather is intended to cover all modifications and alternate methods falling within the spirit and the scope of the invention as defined in the appended claims.

What is claimed is:

1. A trailer hitch cover to be fitted over a trailer hitch having a tow ball and drawbar, said trailer hitch cover comprising:

a shell fabricated from a durable material which does not readily deform upon human contact, said shell having an upper surface which rests over the trailer hitch, first and second side surfaces which extend away from the trailer hitch and towards the vehicle, and a back side forming a triangle with said first and second side surfaces, and wherein said shell has no exposed sharp edges proximal to said upper surface, wherein said first and second side surfaces come together to form a radiused vertex opposite said back side, and wherein said radiused vertex defines an angle between said first and second side surfaces of at least 45 degrees;

a pliable filler material within said shell to fill said shell and to form a base;

a cavity fabricated within said filler material for closely receiving the tow ball and a portion of the drawbar of the trailer hitch; and a fastener for fastening said trailer hitch cover to the drawbar of the trailer hitch.

2. The trailer hitch cover assembly of claim 1 wherein said shell is fabricated from a fiberglass material.

3. The trailer hitch cover of claim 2 wherein said pliable filler material is selected from the group consisting of a rubber substance and a plastic substance.

4. The trailer hitch cover of claim 3 wherein said pliable filler material is an expandable polyurethane foam.

5. The trailer hitch cover of claim 1 wherein said fastener defines a strap at said base of said filler material, said strap having a first end and a second end, said first end of said strap being integral to said filler material proximal to said first side surface of said shell, and said second end of said strap being detachably connectable to said filler material proximal to said second side surface of said shell, with said strap dimensioned to extend beneath the drawbar of the trailer hitch in order to fasten said cover more securely onto the trailer hitch.

6. The trailer hitch cover of claim 5 wherein said second end of said fastener is detachably connectable to said filler material proximal to said second side surface of said shell by hook and loop means.

7. A trailer hitch cover to be fitted over a trailer hitch having a tow ball and drawbar, the trailer hitch being fitted at the rear bumper of a vehicle, said trailer hitch cover comprising:

a fiberglass shell having an upper surface which rests over the trailer hitch, first and second side surfaces which extend away from the trailer hitch and towards the vehicle and which come together to form a radiused vertex, wherein said radiused vertex defines an angle between said first and second side surfaces of at least 45 degrees, and a back side opposite said radiused vertex, said back side forming a triangle with said first and second side surfaces;

a filler material selected from a group consisting of an expanded polyurethane foam, a rubber material and a plastic material within said fiberglass shell to fill said shell and to form a base;

a cavity fabricated within said filler material configured for closely receiving the tow ball, the distal end of the drawbar and a further portion of the drawbar of the trailer hitch, wherein said further portion of the drawbar is angled; and a fastener for fastening said trailer hitch cover to the drawbar of the trailer hitch, said fastener defining a strap at said base of said filler material, said strap having a first end and a second end, said first end of said strap being integral to said filler material proximal to said first side surface of said shell, and said second end of said strap being detachably connectable to said filler material proximal to said second side surface of said shell by hook and loop means, with said strap dimensioned to extend beneath the drawbar of the trailer hitch in order to fasten said cover more securely onto the trailer hitch.

* * * * *